April 14, 1936.  R. G. WULFF  2,037,056
PROCESS OF PRODUCING ACETYLENE GAS
Filed May 9, 1931  2 Sheets-Sheet 1
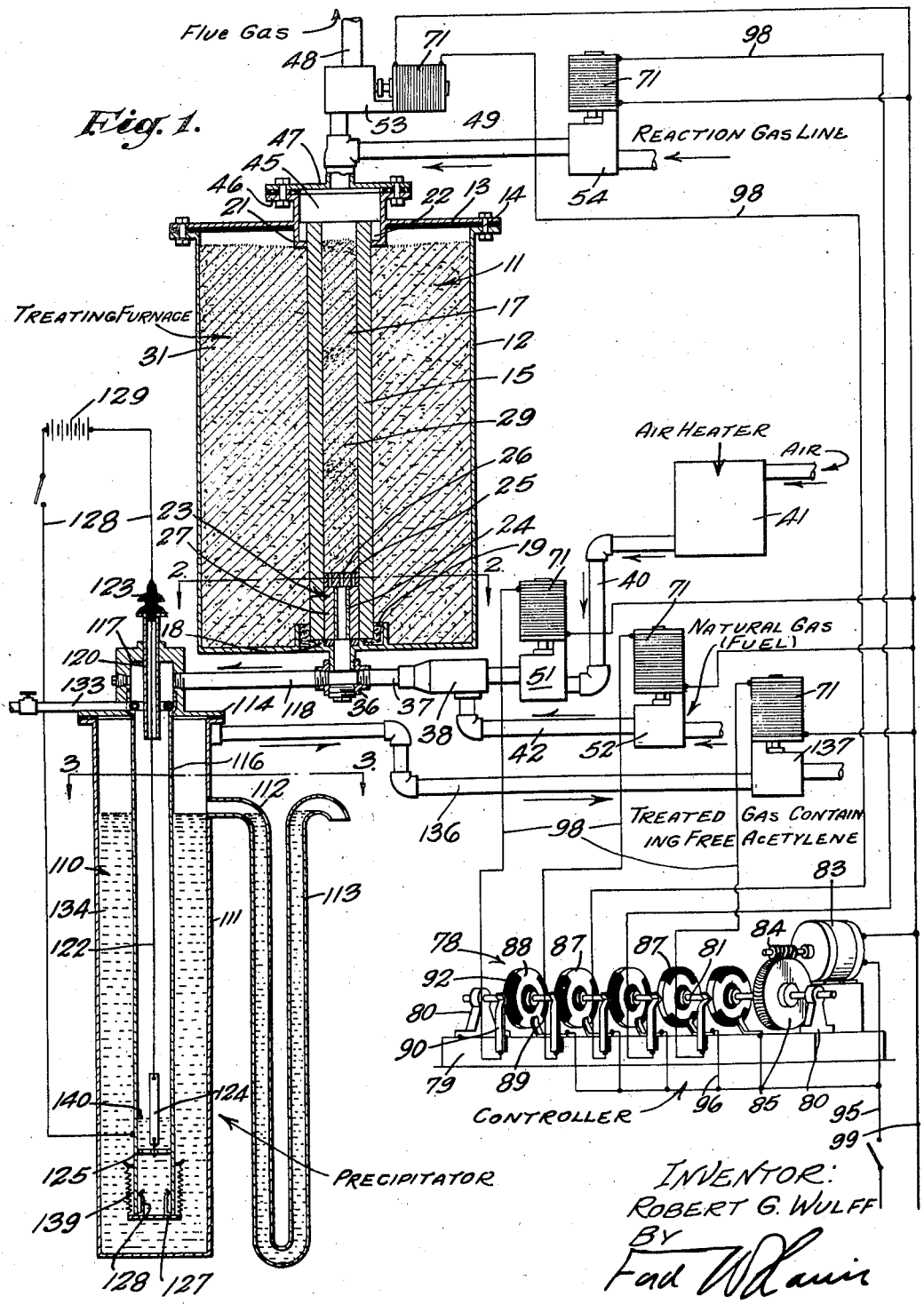

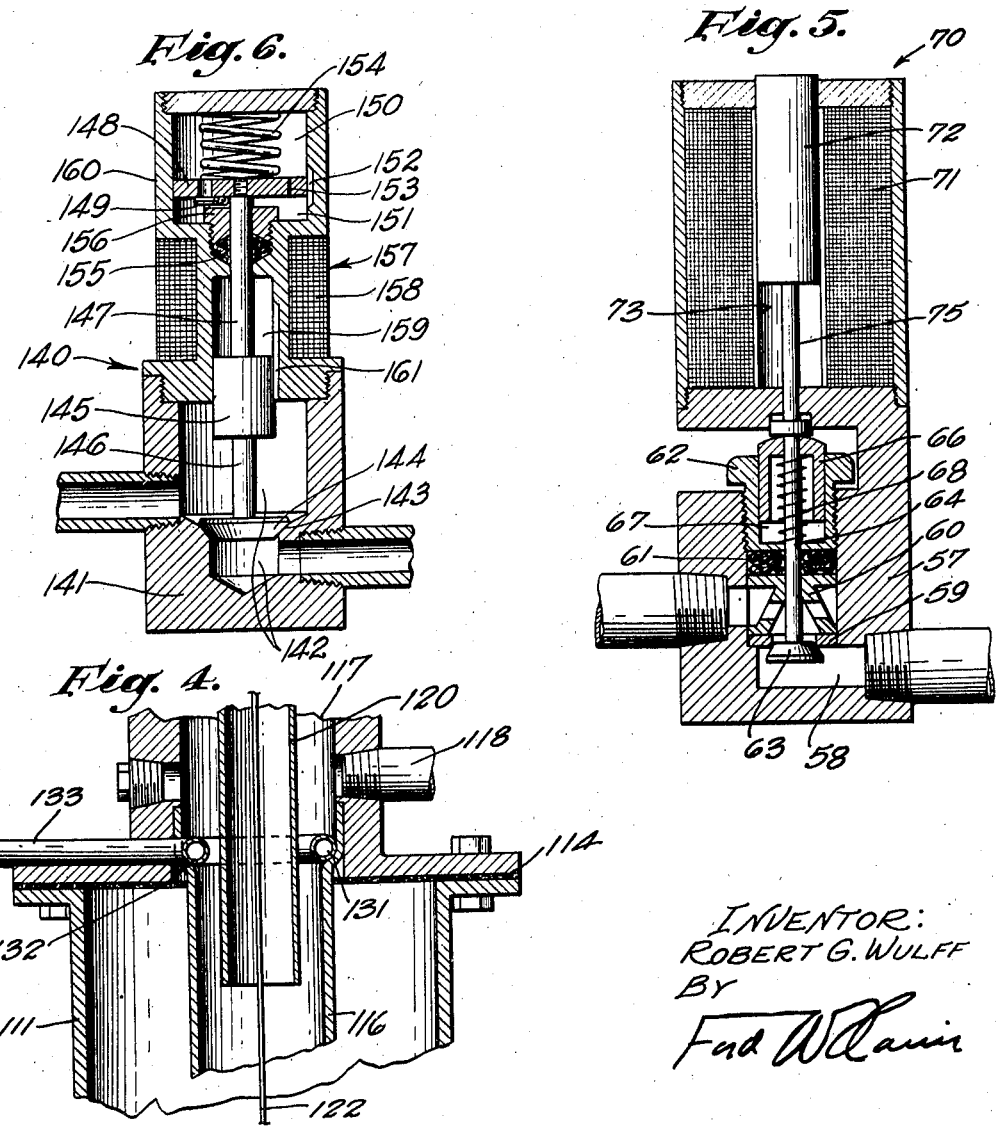

Patented Apr. 14, 1936

2,037,056

UNITED STATES PATENT OFFICE 2,037,056

PROCESS OF PRODUCING ACETYLENE GAS

Robert G. Wulff, Los Angeles, Calif., assignor to Wulff Process Company, Los Angeles, Calif., a corporation of California Application May 9, 1931, Serial No. 536,146

3 Claims. (Cl. 260—170)

This invention relates to the production of acetylene gas and particularly to a method of producing acetyene gas.

This application is a continuation in part of my copending application filed January 11, 1927, Serial No. 160,341.

At the present time the only commercial method of making acetylene gas is from calcium carbide. Calcium carbide is a product of lime and carbon which have been caused to react by a high temperature heat. The carbide is shipped to the place where the gas is to be generated and is placed in a common form of acetylene generator. The carbide in the generator is contacted with water which produces a chemical reaction and releases acetylene gas.

I have found that hydrocarbons, such as natural gas, are capable of being treated so that acetylene gas $C_2H_2$ may be produced. Natural gas is available in large quantities and at a low cost, thus being a favorable raw material from which to obtain acetylene gas.

It is an object of this invention to provide a method of producing acetylene gas from natural gas.

It is a further object of the invention to provide a process of obtaining acetylene gas from a hydrocarbonaceous gas by passing the gas into contact with a mass of highly heated particles.

Other objects and advantages of the invention will be made evident hereinafter.

Referring to the two drawings in which I illustrate a preferred apparatus of my invention:

Fig. 1 is a vertical view, partly sectioned, diagrammatically showing a complete apparatus.

Fig. 2 is a section taken on the line 2—2 of Fig. 1.

Fig. 3 is a section taken on the line 3—3 of Fig. 1.

Fig. 4 is an enlarged fragmentary section of the upper end of a precipitator of the invention.

Fig. 5 is a vertical section through a valve construction of the invention.

Fig. 6 is a vertical section through a valve construction of a modification of my invention.

Referring particularly to Fig. 1, the invention includes a furnace 11 which is shown in cross-section in this figure. The furnace 11 includes a shell 12 having a cover 13 secured thereto by bolts 14 in air-tight relationship therewith, thus providing an air-tight space within the shell 12. Extended vertically through the shell is a cylindrical tube 15 which is preferably formed from fired carborundum. The tube 15 provides a cylindrical treating space indicated by the numeral 17. The lower end of the tube 15 rests within a collar 18 and is surrounded by packing 19, which may be asbestos or an equivalent material, which provides a tight seal. The upper end of the tube 15 extends inside a collar 21 and is surrounded by packing 22 which forms a tight seal. The purpose of the packing means illustrated is to permit a relative expansion and contraction between the tube 15 and the shell 12 so that no undue strains will be placed on either of the parts. At the lower end of the tube 15 is a burner structure 23 which has a sleeve 24 placed on the axis of the tube 15. The sleeve 24 is preferably made from fused silica. Resting on the upper end of the sleeve 24 is a plate 25 having screen openings 26 formed vertically therethrough. The plate 25 is formed from fired carborundum. Surrounding the sleeve 24 is insulation 27 which is preferably silica powder. Placed in the chamber 17 are heating and contacting particles 29. The heating and contacting particles 29 are formed from carborundum crystals and are preferably of very small size. However, particles of any material capable of withstanding the high temperature can be used, so long as these particles do not harmfully affect or prevent the forming of the acetylene. At the lower end of the chamber 17 the particles are four mesh or smaller, at the central part of the chamber 17 they may be slightly larger, say about three mesh, and at the upper end of the chamber 17 they may be three mesh or slightly smaller. The difference in size of the particles at different parts is optional and may be varied according to judgment. The space in the shell 12 surrounding the tube 15 is filled with insulation 31 which is preferably silica powder. The purpose of the silica powder is not only to lessen dissipation of heat, but also to support the tube 15. The silica powder packs around the tube 15.

The bottom of the shell 12 has a nipple 35 which is in communication with the lower end of the sleeve 24. Secured to the nipple 35 is a fitting 36 by means of which a combustible mixture supply line 37 is connected to the chamber 17. Attached to the combustible mixture supply line 37 is a mixer 38 which is of conventional construction. Mixers for gas and air are well known in the art, and the details thereof need not be elucidated here. Attached to the mixer 38 is an air-line 40, and connected in the air-line 40 is an air heater 41. The air heater 41 may be of any suitable standard design. Also connected to the mixer 38 is a fuel gas-line 42. The upper end of the chamber 17 connects to a space 45 formed by a projection 46 and a cover plate 47. Connected to the cover plate 47, so as to communicate with the space 45, is a flue gas-line 48. Connected to the flue gas-line 48, adjacent to the cover plate 47, is a reaction gas-line 49.

Flows of gas through the various gas-lines are controlled by solenoid operated valves. The airline 40 has a valve 51, the fuel gas-line 42 has a valve 52, the flue gas-line 48 has a valve 53, and the reaction gas-line 49 has a valve 54. In a modification of my process I use a valve 140 in the gas-line 49 instead of the valve 54.

The valves 51 to 54 inclusive are typically illustrated in Fig. 5. Referring to this figure, the numeral 57 represents a body having a passage 58 formed therethrough to which the pipe line is connected. Near the central part of the passage 58 is a seat 59 above which is placed a lantern or cage 60. Packing 61 is forced downward against the lantern 60 by means of a nut or gland 62. A valve 63 is adapted to engage the seat 59 and thus close the passage 58. A stem 64 of the valve 63 extends upward through the lantern, packing and gland, and has a thimble 66 secured to the upper end thereof, the thimble 66 resting in a cavity 67 of the gland 62. Compressed between the thimble 66 and the lower part of the gland 62 is a spring 68 which ordinarily holds the valve 63 against the seat 59 so as to close the passage 58. Supported above the construction just mentioned is a solenoid 70 having a solenoid coil 71 and an armature 72 which rests in a central opening 73 of the solenoid coil 71. The armature 72 is made from iron and has a shaft 75 extending downward into engagement with the thimble 66. When the solenoid is energized, the armature 72 is moved downward into the central part of the solenoid coil 71 and the thimble 66 is depressed. This will force the valve 63 downward from engagement with the seat 59 and open the passage 58.

For the purpose of controlling the operation of the valves I provide a controller 78, diagrammatically illustrated in Fig. 1. The controller 78 has a base 79 which supports bearings 80. Rotatably carried by the bearings 80 is a main shaft 81 which is rotated by a drive means consisting of a motor 83, a worm 84, and a worm wheel 85, which worm wheel 85 is connected to the main shaft 81. Supported by the main shaft 81 is a plurality of disc contacts 87 which are insulated from the shaft as illustrated. Each disc contact has a metallic portion 88 which is at all times engaged by a contact finger 89, and which is intermittently engaged by a contact finger 90 as the main shaft 81 is rotated. It should be seen that as each disc rotates, the contact finger 90 first engages the metallic portion 88 and then an insulation part 92.

The valves and the controller 87 are connected in an electric circuit as follows: A conductor 95 is connected to the motor 83, as shown, and it is connected to each contact finger 89 by means of branch conductors 96. Each contact finger 90 is connected to the solenoid coil 71 of a valve by means of a conductor 98. Each solenoid coil 71 and the motor 83 are connected to a conductor 99.

A precipitator 110 of my invention is illustrated in Figs. 1, 3 and 4. The precipitator 110 has a metal tank 111 to which a water-sealed outlet 112 is connected near the upper end thereof. The water-sealed outlet 112 has a U tube portion 113 in which a body of water may collect in order to form a seal. Extended into the tank 111 from a cover 114 thereof is a steel tube 116 which forms an outer electrode of the precipitator. Formed at the upper end of the precipitator above the tank 111 and in communication with the upper end of the steel tube 116 is a dome 117 to which a pipe 118 is connected, the pipe 118 being also connected to the fitting 36. Extended through the dome 117 into the upper end of the steel tube 116 is a protector tube 120 which is preferably made from fused silica which is non-carburizing. Extended into the steel tube or electrode 116 through the protector tube 120 is a central wire electrode 122. The upper end of the wire electrode 122 is supported by an insulator 123 which is carried at the upper end of the protector tube 120. The lower end of the wire electrode 122 is attached to an insulator in the form of a bar 124. The lower end of the insulator 124 is attached to a spider 125 which is supported inside the steel tube 116 near the lower end thereof. The steel tube electrode 116 and the wire electrode 122 are connected in an electric circuit 126 having a source of energy 129. When the circuit just mentioned is completed, an electric field is established between the electrodes, a corona around the wire electrode 122 being produced. The lower end of the steel tube 116 is provided with a valve in the form of a plate 127 which is centralized by fingers 128 and resiliently retained against the bottom of the tube by coil springs 139. As illustrated best in Fig. 4 a wash fluid ring 131 is retained in the upper end of the steel tube 116. The wash fluid ring 131 surrounds the protector tube 120 and has downward directed openings 132 which direct wash fluid along the interior surface of the steel tube 116. Connected to the wash fluid ring 131 is a pipe 133. Connected to the upper part of the tank 111, well above the level of a body of wash fluid 134 therein, is a treated gas delivery line 136 having a solenoid operated valve 137 which is the same construction as any of the valves 51 to 54 inclusive which have already been described. The valve 137 is connected to the controller 78 in the same manner and is operated in the same manner as the other valves. The treated gas delivery line may be extended to a gas holder or to an apparatus for recovering acetylene from the treated gas.

In a modification of my process I may provide that the rate of flow of reaction gas is progressively reduced as the reaction time continues. To this end the valve 54 may be replaced by a valve 140 which is typically illustrated in Fig. 6. This valve is operated by the same electrical controls, but in a slightly modified manner, as will hereinafter be described.

Referring to Fig. 6, the numeral 141 represents a body having a passage 142 formed therethrough to which the pipe line is connected. Near the central part of the passage 142 is a valve seat 143. A valve poppet 144 is adapted to engage the valve seat 143 and thus close the passage 142. The valve poppet 144 is connected to an armature 145 by means of a valve stem 146. The armature is connected by valve stem 147 to dash pot piston 148 which is adapted to move in dash pot 160. The dash pot 160 is completely filled with glycerine or other suitable fluid on both sides of the piston 148. The dash pot piston 148 is provided with a check valve 149 which is so constructed as to allow the glycerine to go from the upper dash pot chamber 150 to the lower dash pot chamber 151, but not vice versa. The dash pot is provided with a by-pass 152, between the upper and lower chambers of the dash pot. The dash pot piston is also provided with an orifice 153. Above the dash pot piston 148 is a spring 154. The valve stem 147 is packed with a packing 155 which said packing is forced downward by means of a nut or gland 156. Just below the dash pot 160 is a solenoid 157 having a solenoid coil 158 and the armature 145 which rests in the central opening 159 of the solenoid coil 158. A by-pass 161 connects the upper part of this central opening 159 with the passage 142. The armature 145 is made of iron. When the solenoid is energized, the armature 145 is moved upward into the central part of the solenoid coil 158, thereby compressing the spring 154, raising the valve poppet 144 and opening the passage 142.

The valve is primarily adapted to be used in lieu of valve 54 and the same electrical connections are used. The disc contact 87 which regulates the flow of current to the solenoid coil 158 must be changed, however, so that the disc is composed practically entirely of an insulating part 92. This is because of the fact that the solenoid coil is to be energized only momentarily. In energizing the solenoid coil 158, the glycerine in the upper dash pot chamber 150 is forced through the check valve 149 into the lower chamber 151. As soon as the circuit is broken the valve poppet 144 closes very slowly due to the passage of glycerine through the orifice 153 and the action of the spring 154. When the dash pot piston reaches the by-pass 152 the valve poppet 144 is suddenly closed to the fully closed position due to the action of the spring 154. In other words, the valve operates so that the rate of flow through the passage 142 is progressively reduced as the cycle continues. The disc contact 87 for this valve is set so that the solenoid coil is energized just before the valve 137 is opened and the spring 154, orifice 153, and by-pass 152 are such that the valve is closed just before the valve 137 is closed.

The method of my invention is as follows:

In starting up the apparatus the valves 51, 52 and 53 are open and the valves 54 and 137 are closed. The positions of these different valves are determined by the controller 78. In the drawings the valves 51, 52, and 53 would be closed since the contact fingers 90 in the circuit of the solenoids of these valves engage the insulation parts 92 of their respective disc contacts 88. Fig. 1, therefore, illustrates the invention at a different period in the operation of the apparatus. The valves 51 and 52, being open, supply air and fuel gas through the pipes 40 and 42 respectively. The air in passing through the heater 41 is raised in temperature. The fuel gas is preferably a natural gas which is obtained from the same source as the gas from which the acetylene gas is to be made. The proportions of air and fuel gas, which I prefer to use, are twelve volumes of air to one volume of fuel gas, being the proportion for complete combustion of the fuel gas used. The gas and the air pass into the mixer 38 where they are thoroughly mixed and where a completely combustible mixture is obtained. The combustible mixture passes through the combustible mixture supply line 37 and through the burner structure 23 into the chamber 17. The combustible mixture flows upward through the flue gas-line 48 and is lighted where it issues therefrom. The flame will burn back into the chamber 17 to a point immediately above the burner structure 23.

To prevent the combustible mixture from burning in back of the burner structure 23, the velocity of the combustible mixture may be increased at this time so that the velocity through the sleeve 24 is greater than the burning of the mixture. The burning of the combustible mixture in the chamber 17 heats the heating and contacting particles to a very high temperature and is continued until the maximum temperature in the lower end of the chamber 17 directly above the burner structure 23 is about 3000° F. This temperature is the maximum temperature which it is practical and economical to obtain in the operation of my process using natural gas as fuel. The temperature at the upper end of the chamber 17 is considerably lower, since the intensity of the flame is greatest immediately above the burner structure.

The pressure of the combustible mixture in the fitting 36, when proper operating temperature is attained, is about four pounds per square inch, and it is obvious that a pressure will be applied to the body of fluid 134 in the steel tube 116 of the precipitator 110 which will force the water level downward into a position indicated at 140 in Fig. 1.

The next step is the treating or reaction time of the process. The controller 78 which acts as a timing device moves into the position illustrated in the drawings. The electric circuits to the valves 51, 52 and 53 are broken and the electric circuits to the valves 54 and 137 are completed. This changes the positions of the valves, opening the valves 54 and 137 and closing the valves 51 to 53 inclusive. The valves 54 and 137 are kept open during the entire reaction period of the process. Instead of using a valve similar to the valve 54, I sometimes prefer to use a valve similar to the valve 140 shown in Fig. 6 so that the rate of flow of the reaction gas is progressively reduced as the reaction time continues. This is in order to provide a rate of reaction gas flow that is best suited at every instant of the reaction time to the temperature conditions existing in the furnace. Reaction gas at this time flows through the reaction gas-line 49 and into the chamber 17. The reaction gas in this disclosure of the invention is raw natural gas such as may be obtained in large quantities in the oil fields of any oil producing locality.

The following is a typical analysis of natural gas obtained from wells in southern California:

$CO_2$   0.72% Carbon dioxide
$O_2$    1.23% Oxygen
$C_nH_{2n}$ 1.69% Ethylene and higher homologs
$N_2$    0.00% Nitrogen (assumed)
$C_2H_6$ 15.44% Ethane
$CH_4$   80.9% Methane 99.98% Total The reaction gas in entering the chamber 17 comes in contact with the heating and contacting particles 29 and is warmed in the upper end of the chamber. At the central part of the chamber the natural gas becomes hot, and when it reaches the lower end of the chamber immediately above the burner structure where the temperature is the greatest, the natural gas is cracked. The cracking of the natural gas forms acetylene gas $C_2H_2$, and carbon particles which are deposited on the heating and contacting particles 29. The natural gas when cracked is also permanently increased in volume.

It is possible to obtain temperatures as high as

3400° F. just above the burner structure, but in order to do so it takes at least 30 minutes of heating with a corresponding low fuel efficiency. As set forth on page 3, at the end of the heating period the temperatures I obtain are approximately 3000° F. The maximum temperature is maintained for only an instant since the temperature drops considerably the moment that the reaction gas starts through. As the reaction period continues the contents of the tube 15 are cooled until the maximum temperature of the tube is approximately 2200° F. The fuel is then turned on and a new cycle commenced. Thus the variation in temperature of the hottest portion of the tube 15 is from 3000° F. to 2200° F., giving an average temperature of approximately 2600° F. Obviously, it is the nature of any intermittent process like this to have fluctuating conditions in which the same steps are repeated many times. In view of the progressive drop in reaction temperature during the reaction time, the reaction gas is best passed more and more slowly through the tube 15 as the reaction time progresses, since it takes longer to form acetylene at lower temperatures. Thus, as explained above, the reaction gas valve 140 is automatically and progressively operated to reduce the rate of gas flow during the reaction time. Undoubtedly acetylene forms more efficiently during the first portion of the reaction period, although considerable quantities of acetylene are still being produced just before the reaction time ends and the fuel time begins. As already set forth, I prefer to heat the tube 15 to a temperature of about 3000° F., and then to allow the reaction period to continue until the maximum temperature of the tube is about 2200° F. Using other natural gases, or raw materials other than natural gas, it probably is preferable to heat the tube to a different maximum temperature and to continue the process until a different lower limit is reached. It may be preferable to make use of a shorter cycle, for example, heating the tube until a maximum temperature of about 2800° F. is obtained and continuing the reaction period until a temperature of about 2300° F. is reached. I have found that acetylene begins to appear at cracking temperatures of 1800° F., and that the percentage of acetylene formed increasing with the temperature clear up to the temperature limits of furnace combustion. The temperature limits in the tube 15 and the average obtained in the treatment of reaction gas therein, as just given, is for the condition where the air of the combustible mixture, that is, the air for the fuel, is not preheated, but is mixed with the fuel gas at room temperature and fed to the burner structure in this condition. If the air is preheated the temperatures in the tube 15 are somewhat higher than the figures given.

The treated gas passes through the burner structure 23 and the pipe 118 into the upper end of the tube 116 where it is suddenly chilled by the washing action of the wash fluid and reduced to such a temperature that the acetylene gas becomes stable. The treated gas passes downward through the tube 116 where it is subjected to the action of the electric field which operates to remove any solid and liquid particles from the gas. The electric field causes the particles carried by the treated gas to move outward into contact with the inner surface of the tube 116. The solid or liquid particles consist essentially of tar, oil, and carbon. Wash fluid is supplied to the inner surface of the tube 116, as previously described, at a rate of about two cubic feet per hour. The wash fluid is preferably water and contains about 9.1 cubic inches of kerosene to every two cubic feet of wash fluid. The purpose of the kerosene is principally to soften the tar. The treated gas when it passes into the tube 116 forces the water entirely from the lower end of the tube. Opening the valve 127 the treated gas passes from the lower end of the tube 116 and bubbles upward through the body of wash fluid 134. The treated gas passes from the upper end of the tank 111 through the treated gas delivery line 136. The chemical analysis of the treated gas is substantially different from the analysis already given of the natural gas from which the treated gas was formed. The following is a typical analysis of the treated gas which passes through the treated gas delivery line 136.

| | | |
|---|---|---|
| $CO_2$ | 0.70% | Carbon dioxide |
| $O_2$ | 0.46% | Oxygen |
| $C_nH_{2n}$ | 7.47% | Ethylene and homologs |
| $H_2$ | 29.65% | Hydrogen |
| CO | 1.69% | Carbon monoxide |
| $CH_4$ | 51.20% | Methane |
| $N_2$ | 3.91% | Nitrogen |
| $C_2H_6$ | 0.00% | Ethane |
| $C_2H_2$ | 4.93% | Acetylene |
| | 100.01% | |

The recovery of the actylene gas from the treated gas is not a part of this invention and may be recovered in any of the various well known manners. The acetylene gas, for instance, may be recovered by refrigeration under pressure, by absorption in a solution of cuprous-chloride in ammonia which forms a solid copper carbide from which acetylene can be liberated in pure form by action of a suitable acid or potassium cyanide, or by a selective solution in acetone using suitable pressure and temperature variations.

With the ending of the reaction time of the apparatus a complete cycle has been performed and a new cycle is commenced. The valves change into opposite positions; that is, into the positions first mentioned. At the changing of the positions of the valves there is a momentary release of pressure. At this time the valve 127 will close the lower end of the tube 116 and prevent the wash fluid from filling this tube. When the pressure is again established, the fluid level inside the tube 116 is as illustrated at 140 in Fig. 1. It will be seen that if it were not for the valve 127 the tube 116 might fill with fluid to the same level as in the space around the tube 116 in the tank 111. This would result in a shorting of the tube 116 and the wire electrode 122. If the wash fluid were permitted to fill the tube 116, it would be forced down when the combustible mixture pressure is again established, thus allowing combustible mixture to enter the tube 116 and mix with the treated gas. As it is, the water level 140 is below the upper end of the bar insulator 124. When the combustible mixture passes into the lower end of the chamber 17 it is immediately ignited and the carbon deposited in a previous operation is burned, and the heat value thereof is utilized. For this reason it is desirable to have a small excess of air in the combustible mixture so that the carbon will be effectively burned out.

In the normal operation of the apparatus the acetylene gas yield varies between four and six per cent according to the several rates of gas flow and the time length of the fuel time and the reaction time. In the tests in which the following data was obtained, the rate of gas flow during the reaction time was held constant, and was not progressively reduced as the acetylene formation continued. In other words a valve similar to the valve 54 was used to regulate the flow of raw material, and not a valve similar to the valve 140. The data gives a number of different tests carried out under different conditions.

*Table*

| Test No. | Air flow | Gas flow | Fuel flow | Reaction time | Fuel time | Cycle time | Increase ratio |
|---|---|---|---|---|---|---|---|
| 214 | 240 | 300 | 20 | 4.66" | 9.52" | 14.18" | 1.283 |
| 234 | 240 | 240 | 20 | 8.29 | 14.29 | 22.58 | 1.360 |
| 261 | 300 | 360 | 25 | 7.43 | 15.15 | 22.58 | 1.354 |
| 266 | 300 | 360 | 25 | 5.99 | 16.59 | 22.58 | 1.516 |

| Test No. | Time reaction gas is in tube 15 | Time any particular molecule is in acetylene forming zone | $C_2H_2$ per cent | Fuel $C_2H_2$ |
|---|---|---|---|---|
| 214 | 0.087 | 0.010 | 5.06 | 2.09 |
| 234 | 0.109 | 0.0125 | 5.03 | 2.10 |
| 261 | 0.072 | 0.0083 | 4.78 | 2.19 |
| 266 | 0.072 | 0.0083 | 6.00 | 2.12 |

In the foregoing data the definitions have certain meanings which are as follows:

1. All flows are given in cubic feet per hour, ditto volumes.

2. "Cycle time" means the number of seconds required to complete one cycle of operation of the furnace, which includes firing it once, and passing reaction gas through once.

3. "Reaction time" means the number of seconds required for passing the said reaction gas through once. In other words it is that portion of the cycle time in seconds during which the valves are set to allow the flow of reaction gas and prevent the flow of fuel gas.

4. "Fuel time" means the number of seconds required for firing the furnace once. In other words it is that portion of the cycle time in seconds during which the valves are set to allow the flow of fuel gas and prevent the flow of reaction gas.

5. "Time ratio" is proportion of heating time to reaction time.

6. Increase ratio is ratio of treated reaction gas-volume (including acetylene) to volume of gas run through (raw reaction gas). This gas on cracking undergoes permanent increase in volume.

7. $\dfrac{\text{"Fuel"}}{C_2H_2}$ means cubic feet fuel required per one cubic foot pure acetylene formed which measures the fuel economy of the test.

8. The "time reaction gas is in tube 15" is the time in seconds that it takes the reaction gas to traverse the tube 15 from top to bottom.

9. The "time any particular molecule is in acetylene forming zone" is the actual length of time in seconds that any particular hydrocarbon molecule of the reaction gas is subjected to temperatures great enough to form acetylene gas.

It is obvious from the foregoing that one reaction time plus one fuel time equals one cycle time, as may be seen by adding the figures in the table. The fuel time, reaction time and cycle time are entirely distinct from the time reaction gas is in tube 15, which is an estimate of the actual time in seconds that any one portion of reaction gas is in the tube, for it should be clear that the time required for such a portion of gas to traverse the tube 15 depends on the size of the tube and on how it is filled. A very small tube would require the smallest fraction of time for the gas to get through, whereas a large one might require seconds.

The following illustration will make this period of time definitely understandable. In my experiments in which I used the apparatus of Fig. 1 and obtained the data of tests Nos. 214, 234, 261, and 266, as given in the table on page 5, the tube 15 that I used was made from fired carborundum, measured 27 inches in length, and was 2.0 inches inside diameter. It was fully filled with approximately three mesh carborundum crystals, and I ascertained that the void space within said tube, where the gas was to flow, was half of the internal volume of the tube without the filling. The net void space thus figured geometrically, is 42.5 cubic inches, or 0.0246 cubic feet. Now in test 214, as set forth in the table referred to, the reaction gas, during the reaction time, was flowing at a rate of 300 cubic feet per hour. In other words, during the 4.66 seconds that it flowed it was flowing at the rate of 0.833 cubic feet per second. If the void space in the tube was only 0.0246 cubic feet, as figured above, the gas could not possibly stay in said tube even one second. The maximum average time it could stay there is 0.0246/0.833 or 0.296 second. It is clear, however, that the reaction gas as it enters the furnace does not stay cold, but immediately begins to expand enormously due to the heat, and is driven through the tube much faster than just calculated. If the reaction gas reaches a temperature of 2600° F. in the hottest portion of the tube, we may assume roughly that the temperature averages half way from that to room temperature, or an average of 1335° F. By Charles Law for the expansion of gases, we correct the value of 0.296 second to 0.087 second. This last value is the approximate length of time required for any one molecule of the reaction gas to get from the upper end of tube 15 to the lower end under the conditions in which Test No. 214 was performed. I have found, however, that the acetylene formation does not begin at the top of the tube 15, but only near the bottom where it is above 1800° F. Obviously the acetylene formation zone decreases in length and volume as the formation of the acetylene continues, due to the cooling of said zone by the reaction gas flowing through. As mentioned on page 3, I have provided means for decreasing gradually the reaction gas flow to allow sufficient time during the reaction time for the acetylene to form efficiently while said acetylene forming zone is decreasing due to drop in temperatures. During the middle of the acetylene forming part of the cycle when the maximum temperature in the tube 15 is about 2600° F., I have found that the time in seconds in which any particular molecule of the reaction gas is subjected to temperatures great enough to form acetylene gas is about .01 second. This is for the conditions under which Test No. 214 was performed. The remaining tests show corresponding values, since the tube 15 and all other conditions except those noted in the table were the same. These values have been computed and are set forth in said table.

In general, we prefer to control the flow of the reaction gas so that it is in the tube 15 from about .07 to .11 second, as shown in the table. However in using tubes of large capacity or in processes in which the reaction gas is subjected to comparatively low acetylene forming temperatures, the reaction gas may be in the tube 15 as long as one second. On the other hand, when tubes of very small capacity are used, or in processes when the reaction gas is subjected to temperatures above 3000° F., the reaction gas may be in the tube 15 for about .01 second only.

Similarly in processes when large tubes or comparatively low temperatures are used, the reaction gas may be in the acetylene forming zone for about .1 second, and when narrow tubes or comparatively high temperatures are used, the reaction gas may be in the acetylene forming zone for about .001 second only.

The internal volume of the pipe 118 and couplings between the exit of tube 15 and the water spray 133 is approximately one-seventh of that of the void spaces of the tube 15 when filled as used in my process. In other words, it is about 6 cubic inches, practically the same volume as that of the void spaces in the acetylene forming zone and therefore it takes the gas less than .02 second to traverse this distance. It is advisable also, in large installations, to water jacket the tube 118 wherever possible to chill quickly, and even to introduce water spray therein just below the burner structure. In general it is desirable to design a furnace so that the reaction gases are cooled as quickly as possible after they leave the acetylene forming zone.

I have found that it is possible to obtain a higher temperature in the chamber 17 by preheating the air and I therefore utilize the air heater 41. It is probable that the yield of acetylene gas may be increased by decreasing the size of the carborundum particles 29 so that a larger area of contact may be procured.

The data of the table were secured without preheating the air in order to determine what can be done under these conditions. If the air is preheated and the reaction time is kept the same, the temperatures within the tube 15 are necessarily higher, and the yield of acetylene therefore greater.

The data of the table are merely representative, and do not show the limits within which the process is operable. I have been able, for instance, to get 5.8% acetylene with a gas flow at the rate of 140 cubic feet per hour and a fuel flow of 20 cubic feet per hour. The data of said table show conditions where the best results are to be had, while actually good results can be obtained with conditions quite different. Using the furnace I have described, the cycle time can be longer than 22 seconds or shorter than 14 seconds, while the fuel flow can be as high as 35 cubic feet per hour. Also the ratio of the fuel time to the reaction time may be as low as 1.00 or as high as 3.00, that is, the reaction time may be as long as the fuel time, or one-third as long. The acetylene formation period for any particular hydrocarbon decreases with increasing temperature; in other words, the higher the temperature in the tube 15, the shorter need be the time of treatment in order to obtain the same amount of acetylene. It should be remembered that the table sets forth some of the most economical conditions of operation and that any considerable variation from said conditions will result in loss of efficiency. The last column of the table gives the cubic feet of fuel required to produce one cubic foot of pure acetylene. The value of 2.0 is about the lowest that I have been able to obtain, while if other conditions are used the value easily goes up to 4.0 and even up to 9.0 and above if the conditions of operation are not properly chosen.

It should be apparent that considerable economy is effected in the invention due to the direct manufacture of the acetylene gas as distinguished from the ordinary method of obtaining the acetylene gas from a previously mentioned carbide. The direct manufacture of the acetylene gas reduces the energy input and eliminates lime losses. The treated gas after the acetylene gas has been separated from it may be sold and there will be no loss in this respect. Economy is effected by using the heat value of the carbon deposited in the furnace during the reaction time, by the use of an excess of air in the combustible mixture.

Although I prefer to use natural gas of the composition disclosed, a wetter natural gas can be used, that is, a natural gas containing extractable casinghead gasoline. I have also found that I can use a natural gas containing large quantities of ethane, propane, and butane, which latter are not regarded primarily as gasolines. I have found that I can make acetylene from still-vent gases, of the usual gasoline cracking plants, such gases containing high percentages of olefines, particularly ethylene and propylene, together with methane and hydrogen. I regard the hydrocarbons in such cracked gases and vapors very valuable in formation of acetylene. Any such composition as described above is referred to herein as a hydrocarbonaceous gas or a reaction gas. I have also found that in using a reaction gas containing a substantial proportion of paraffin hydrocarbons higher than methane, larger yields of acetylene are obtainable than in using ordinary natural gas as the reaction gas. The words "higher than methane" are intended to include gases having a higher proportion of carbon to hydrogen atoms than methane. Methane $CH_4$ has one carbon atom to four hydrogen or the carbon to hydrogen proportion is 0.25. Ethane $C_2H_6$ for example has the higher proportion of .33⅓.

The apparatus by which the method may be carried on is of simple construction, being inexpensive to construct and inexpensive in upkeep. The method may be carried out at substantially atmospheric pressure.

The surface combustion method of heating the carborundum crystals 29 is highly desirable because it avoids the problem of heat transfer through the walls of the chamber 17. This conduces to an economy in fuel consumption and also to an economy of fuel time (the time required for heating the particles 29). A further advantage of surface combustion is that it is possible to offer the maximum temperature where it is needed; that is, inside the chamber 17 and not around the walls thereof.

The use of carborundum for the tube 15 and the particles 29 is important to the invention. There are many materials which are suitable in ordinary furnaces but cannot be used in my invention either because they destroy the acetylene when formed or cannot stand the high variable temperatures.

Considering the high speed and the pressure with which the cold reaction gas is forced downward through the tube 15 after a strenuous brief period of forced heating, and the rapidly repeated alternation of heating and cooling, I have been surprised to find that there could be found a refractory material which would not spall. The carborundum material I have used stands it, though if the tubes are not of the best quality of fired carborundum they will crack. It is significant to have found that there is a refractory material that will serve, since the temperatures are so high that no metallic material whatever would be practical. Not only are the temperatures excessive for metallic surfaces, but the severe oxidation effects during firing, coupled with carbonization and embrittlement during the formation of acetylene, are too severe for anything except stable refractory walls.

The precipitator is an important part of the invention since it serves the purpose of chilling the treated gas to such a temperature at which the acetylene gas is stable and also of removing solid or liquid particles from the treated gas.

Although I have described my invention with respect to certain particular embodiments thereof, nevertheless I do not desire to be limited to the particular details shown and described except as clearly specified in the appended claims, since many changes, modifications and substitutions may be made without departing from my invention in its broader aspects and my invention in its broader aspects may be found useful in many other applications thereof.

I claim as my invention:

1. A process of producing acetylene gas from natural gas comprising: heating refractory particles in excess of 1800° F., passing natural gas into contact with said heated particles for a sufficiently brief period to enable acetylene gas to be formed without entirely converting the hydrocarbons into hydrogen and carbon, decreasing the flow of said natural gas as said acetylene is formed, and cooling the resulting gas in less than one second.

2. A process of producing acetylene gas from natural gas comprising: heating refractory particles in a heating chamber in excess of 1800° F., passing natural gas into contact with said heated particles for a sufficiently brief period to enable acetylene gas to be formed without entirely converting the hydrocarbons into hydrogen and carbon, the total time that any particular molecule of said natural gas is in said chamber being less than one second, decreasing the flow of said natural gas as said acetylene is formed, and suddenly cooling the reaction products to a temperature at which acetylene is stable.

3. A process of producing acetylene gase from natural gas comprising: heating refractory particles in a heating chamber in excess of 1800° F., passing natural gas into contact with said heated particles for a sufficiently brief period to enable acetylene gas to be formed without entirely converting the hydrocarbons into hydrogen and carbon, the total time that any particular molecule of said natural gas is in said chamber being less than one second, decreasing the flow of said natural gas as said acetylene is formed, and cooling the resulting gas in less than one second.

ROBERT G. WULFF.